(12) United States Patent
Galazin et al.

(10) Patent No.: US 6,679,509 B1
(45) Date of Patent: Jan. 20, 2004

(54) TRAILING ARM SUSPENSION WITH ANTI-CREEP AUTOMATIC RESET

(75) Inventors: Gregory T. Galazin, Montague, MI (US); Perry W. Thomas, Muskegon, MI (US)

(73) Assignee: The Holland Group, Inc., Holland, MI (US)

( * ) Notice: Subject to any disclaimer, the term of this patent is extended or adjusted under 35 U.S.C. 154(b) by 0 days.

(21) Appl. No.: 09/914,890

(22) PCT Filed: Feb. 22, 2000

(86) PCT No.: PCT/US00/40008

§ 371 (c)(1),
(2), (4) Date: Sep. 4, 2001

(87) PCT Pub. No.: WO00/53442

PCT Pub. Date: Sep. 14, 2000

Related U.S. Application Data

(60) Provisional application No. 60/123,939, filed on Mar. 12, 1999.

(51) Int. Cl.[7] .................................................. B60G 9/02
(52) U.S. Cl. ..................... 280/124.116; 280/124.157; 280/755; 280/757
(58) Field of Search .................. 280/124.157, 124.158, 280/124.159, 124.116, 755, 757

(56) References Cited

U.S. PATENT DOCUMENTS

| | | | |
|---|---|---|---|
| 4,865,349 A | | 9/1989 | Church, Jr. |
| 5,312,119 A | | 5/1994 | Schneider et al. |
| 5,333,645 A | * | 8/1994 | Galazin .................. 137/627.5 |
| 5,452,919 A | * | 9/1995 | Hoyle et al. ............. 280/5.514 |
| 5,466,007 A | * | 11/1995 | Smith ...................... 280/6.157 |
| 5,890,737 A | | 4/1999 | Hutka |
| 5,921,354 A | * | 7/1999 | Evans ....................... 188/73.2 |
| 5,921,532 A | | 7/1999 | Pierce et al. |
| 6,009,978 A | * | 1/2000 | Chisholm ................... 184/3.2 |
| 6,152,486 A | | 11/2000 | Pierce |
| 6,257,597 B1 | | 7/2001 | Galazin |

FOREIGN PATENT DOCUMENTS

| | | |
|---|---|---|
| EP | 0 401 100 | 12/1990 |
| WO | WO 93/19959 | 10/1993 |
| WO | WO 96/09179 | 3/1996 |
| WO | WO 97/37864 | 10/1997 |

\* cited by examiner

Primary Examiner—Paul N. Dickson
Assistant Examiner—Toan To
(74) Attorney, Agent, or Firm—Price, Heneveld, Cooper, DeWitt & Litton

(57) ABSTRACT

A trailing arm suspension (10) with a height control valve (70) in combination with an anti-creep device (12) having an automatic reset mechanism (90) that pressurizes the air spring of the trailing arm suspension until the rotatable arm (60) of the anti-creep device (12) is free to rotate from an extended position to a retracted position, even if the ride height is set too low. The automatic reset mechanism (90) adjusts the trailer height to prevent the binding of the trailing arm suspension and the anti-creep device when the height control valve (70) is improperly adjusted.

16 Claims, 3 Drawing Sheets

TRAILING ARM SUSPENSION WITH ANTI-CREEP AUTOMATIC RESET

CROSS-REFERENCE TO RELATED APPLICATION

This application claims priority on International Application No. PCT/US00/40008, filed Feb. 22, 2000, which claims priority on U.S. Provisional Application Ser. No. 60/123,939, filed Mar. 12, 1999.

BACKGROUND OF THE INVENTION

1. Field of the Invention

The invention relates to trailing arm suspensions for supporting a vehicle trailer. In one of its aspects, the invention relates to a trailing arm suspension with an anti-creep device that prevents the translational movement of a parked trailer during loading of the trailer.

2. Description of the Related Art

Trailing arm suspensions are commonly used in heavy-duty vehicles such as tractor/trailers. A typical trailing arm suspension comprises a hanger bracket and an air spring both having one end mounted in spaced relationship and extending downwardly from a frame rail. A trailing arm extends between the hanger bracket and the air spring. One end of the trailing arm is rotatably mounted to the hanger bracket, usually by an elastomeric bushing. The other, opposing, end of the trailing arm is mounted to a bottom portion or piston of the air spring. The trailing arm is adapted to mount a vehicle axle, which rotatably supports the wheels. Any vertical movement of the wheels in response to changes in the road surface is translated into a rotation of the trailing arm with respect to its pivotal mounting at the hanger bracket. The air spring dampens the pivotal movement of the trailing arm.

Tractor-trailer configurations commonly use air-operated brakes that are supplied pressurized air from an air reservoir tank supplied by a compressor on the tractor. The air-operated brakes are well known and include an emergency brake utilizing a large force compression spring that is compressed by the pressurized air to release the emergency brake. The intentional or accidental loss of the pressurized air to the emergency brakes results in their application. The brakes also include an air-operated service brake for normal braking operations.

The air springs and air-operated brakes are all pressurized by the same air reservoir tank. For safety purposes, the air springs and air-operated brakes are pressurized by discrete plumbing systems or lines to ensure that the brakes are given priority. The air supply to the air springs is terminated when the pressurized air supply drops below a predetermined pressure to ensure a sufficient supply of air to operate the brakes. Within the brake system, the emergency brakes are pressurized by a different line than the service brakes.

It is common for trailers having a trailing arm suspension to incorporate a height control valve to set the ride height of the trailer with respect to the ground. The height control valve is typically connected to the air spring supply line. The height control valve has three positions: a fill position, a neutral position, and an exhaust position. In the fill position, the height control valve fluidly connects the pressurized air source to the air spring to inflate the air spring and raise the frame rail relative to the trailing arm. In the exhaust position, the air spring is fluidly connected to the atmosphere to permit the exhausting of pressurized air from the air spring to deflate the air spring and lower the frame rail relative to the trailing arm. In the neutral position, the air spring is neither connected to the source of pressurized fluid nor to the atmosphere.

The height control valve is actuable between the filled, neutral, and exhaust positions by a rotatable arm that is mechanically linked by an adjustable mechanism, such as a variable length linkage, to the trailing arm. By adjusting the linkage between the trailing arm and the rotatable arm of the height control valve, it is possible to set the ride height of the trailer to a predetermined level.

In addition to a height control valve, trailers typically include an anti-creep device to prevent the trailer from creeping away from the loading (lock as the trailer is being loaded. The creeping phenomenon is attributable to weight that is added to the trailer when the pressurized air source is unavailable, which is typical during loading. Without the availability of additional pressurized air, the air springs cannot be inflated to compensate for the reduced height attributable to the increasing trailer weight during loading. The reduced height is attributed to the relative movement of the frame toward the axle upon the addition of weight to the trailer. The resulting effective pivoting of the frame with respect to the rotates the wheels since the wheels are in contact with the ground, which drives the trailer away from the loading dock. This is known as the creeping phenomenon.

One type of class of anti-creep devices comprises a rotatable arm that is coupled to an air actuator controlled by supplied air by the air spring system and actuated by the brake system. When the vehicle is operated under normal conditions, the rotatable arm is kept in a raised position generally parallel and beneath the frame rail. When the trailer is being loaded and the emergency brakes are exhausted, the rotatable arm is rotated to an extended position where its end lies just above the trailing arm. Any relative movement of the frame rail and the trailing arm will be stopped once the rotatable arm contacts the trailing arm.

The rotatable arm anti-creep devices have known disadvantages. First, if the trailer, especially a loaded trailer, is unlooked from the tractor and allowed to sit for an extended period of time, the height control valve can temporarily "freeze" prohibiting the introduction of pressurized air from the trailer's air reservoir tank to the air springs to raise the trailer to its predetermined ride height. This problem is exacerbated in that over extended periods of time, the pressurized air will slowly leak from the pressurized air system resulting in a very slow and gradual lowering of the vehicle ride height. When one or both of these conditions occur, the arms of the anti-creep device, which are in the extended position, can be bound or compressively retained in the extended position.

The coupling of the tractor to the trailer and the corresponding pressurization of the air systems will not always overcome the temporary freezing of the height control valve, leaving the suspension in an inoperable state. The subsequent jarring of the trailer during initial movement will free the frozen height control valve and the height control valve can operate normally to raise the trailer and free the arms. If the height control valve remains frozen, the suspension will not function properly and can be damaged. Second, during the backing of the trailer toward the dock, it is common for the tractor operator to quickly and forcefully apply the brakes when the trailer has reached the loading position relative to the dock and simultaneously apply the emergency brake, which immediately moves the arms of the anti-creep device to the extended position. Depending on the timing between stopping the rearward movement of the trailer and the application of the emergency brakes, it is possible for the momentum of the trailer to temporarily lower the rear of the trailer relative to the trailing arm, preventing the full extension of the rotatable arm of the anti-creep device. Alternatively, it is possible for the rotatable arm of the anti-creep device to be fully deployed but the rearward momentum of the trailer lowers the height of the trailer and compresses the arm between the trailer frame and the trailing arm. If the trailer air reservoir tank is not pressurized above the safety threshold, then no air is available to raise the trailer to the preferred height.

It is desirable to prevent the binding of the anti-creep device arms between the trailer frame and the trailing arm to avoid damaging the suspension.

SUMMARY OF THE INVENTION

The invention addresses the shortcoming of the prior art in a trailing arm suspension with a height control valve in combination with an anti-creep device by means of an automatic reset mechanism that pressurizes the air spring until the rotatable arm is free to rotate to the retracted position, even if the ride height is set too low. The automatic reset mechanism adjusts the trailer height to prevent the binding of the trailing arm suspension and the anti-creep device when the height control valve is improperly adjusted.

According to the invention, a trailing arm suspension for supporting ground-engaging wheels relative to a vehicle frame has a trailing arm with a forward portion adapted to be mounted to the vehicle frame for pivotable movement with respect thereto. An air spring is mounted at one end to the trailing arm and is adapted to be mounted at another end to the vehicle frame. An axle is connected to the trailing arm for carrying the ground-engaging wheels. A pneumatic air supply system for pressurizing the air spring includes a height control valve for controlling the introduction of exhaustion of pressurized air to and from the air spring to control the relative position of the vehicle frame with respect to the axle. An anti-creep mechanism is adapted to be mounted to the vehicle frame and is movable between a retracted position where the trailing arm is free to pivot relative to the vehicle frame and an extended position where the trailing arm is substantially prevented from pivoting toward the vehicle frame. An auxiliary air supply system for pressurizing the air spring includes a second control valve for controlling the pressure to the air spring. An actuator is responsive to the movement of the anti-creep mechanism between the extended and retracted positions for closing the second control valve when the anti-creep mechanism is in the retracted position and is further responsive to movement of the anti-creep mechanism between the retracted and extended positions for opening the second control valve.

In a preferred embodiment, the arm is adapted to be pivotally mounted to the vehicle frame and the arm extends between the vehicle frame and the trailing arm to block the relative pivotable movement of the trailing arm toward the frame. The actuator preferably comprises a link coupling the arm to the second control valve. When the arm is the retracted position, the link closes the control valve to prevent pressurization of the air spring. When the arm is in the extended position, the link opens the control valve for pressurization of the air spring from the auxiliary air supply.

In a preferred embodiment, the control valve comprises a body having an inlet port fluidly connected to the auxiliary air supply system, an outlet port fluidly connected to the air spring and a lever movable between a first position at which the inlet and outlet ports are fluidly blocked and a second position at which the inlet and outlet ports are fluidly connected. The link is connected to the lever and moves the lever between the first and second positions as the arm is moved between the retracted and extended positions.

In a further embodiment of the invention, the anti-creep mechanism further comprises a rod adapted to be mounted for rotation about an elongated axis thereof to the vehicle frame and the arm is fixedly mounted to the rod whereby rotation of the rod about its longitudinal axis moves the arm between the retracted and extended positions.

The anti-creep mechanism further comprises in a preferred embodiment an air-operated actuator connected to the rod and fluidly connected to the pneumatic air supply system. The pneumatic air supply system pressurizes the air-operated actuator to rotate the rod to a retracted position and thereby rotate the arm to the retracted position. When the pneumatic air supply system is shut down, the rod rotates to an extended position at which the arm is rotated to the extended position.

DESCRIPTION OF THE PREFERRED EMBODIMENT

Figure 1:
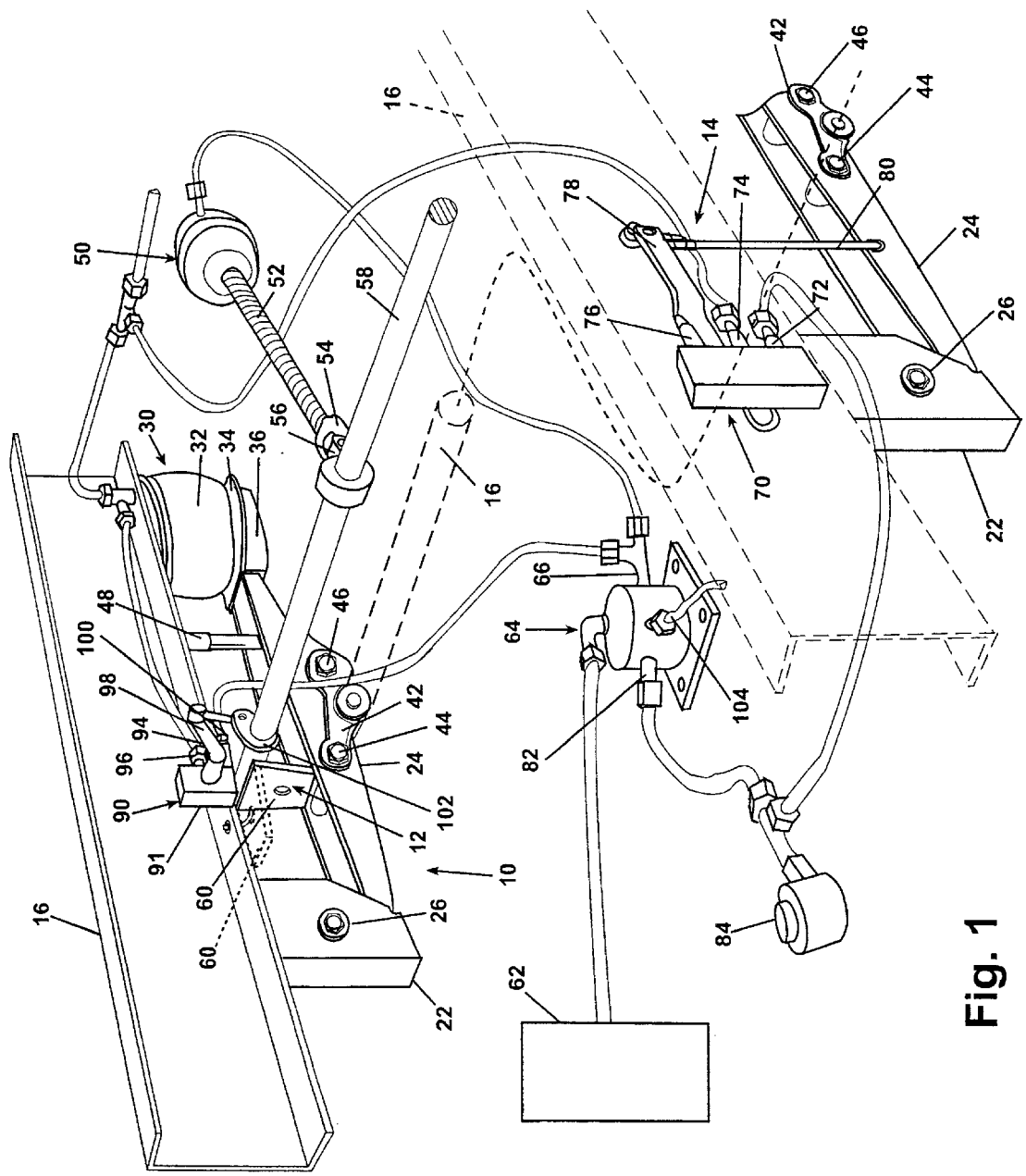
FIG. 1 is a combination perspective and schematic view illustrating the pressurized air system for the suspension, anti-creep device, and height control device.

FIG. 1 illustrates a trailing arm suspension 10 in combination with an anti-creep device 12 and a height control device 14. The trailing arm suspension 10 is mounted to a longitudinal frame rail 16 and supports an axle 18 to which wheels 20 are mounted on opposite ends of the axle 18. In a typical trailer application, two pairs of trailing arm suspensions are used to mount the axle 18 to the frame rail 16 and support opposing ends of the axle 18. Only one of the trailing arm suspensions will be described in detail.

The trailing arm suspension 10 comprises a hanger bracket 22 fixedly mounted to the frame rail and to which is rotatably mounted a trailing arm 24 by means of a bushed connection 26 located at the forward end of the trailing arm 24. The rearward end of the trailing arm 24 mounts an air spring 30 at a lower end thereof, which is connected to the frame rail 14 at its upper end. The air spring 30 resiliently resists upward movement of the trailing arm 24 with respect to the frame and comprises an air bag 32 mounted to the frame rail 14 and a piston 34 mounted to a platform 36 on the trailing edge of the trailing arm 24. As the trailing arm 24 rotates, the piston 34 is urged into the air bag 32 to resiliently resist movement of the trailing arm 24 toward the frame rail 14.

The axle 16 is mounted to the trailing arm 24 by an axle mounting bracket 40 connected to the trailing arm 24 through two bushed connections 44 and 46. A shock absorber 48 can be mounted between the frame rail 14 and the axle bracket 40 to dampen the movement of the trailing arm 24 with respect to the frame.

Figure 2:
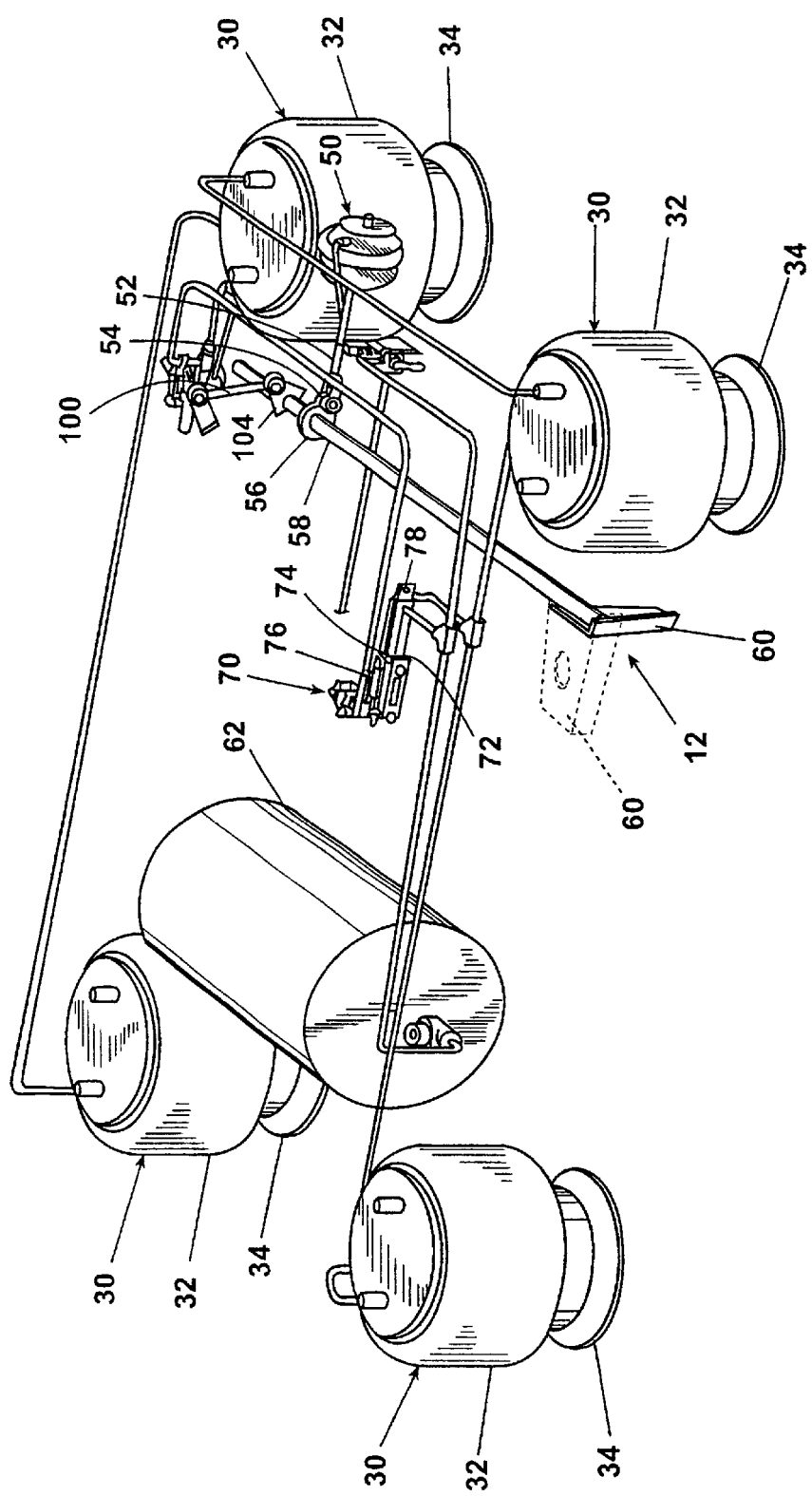
FIG. 2 is a perspective view of the air-operated elements of the trailing arm suspension of FIG. 1.
Figure 3:
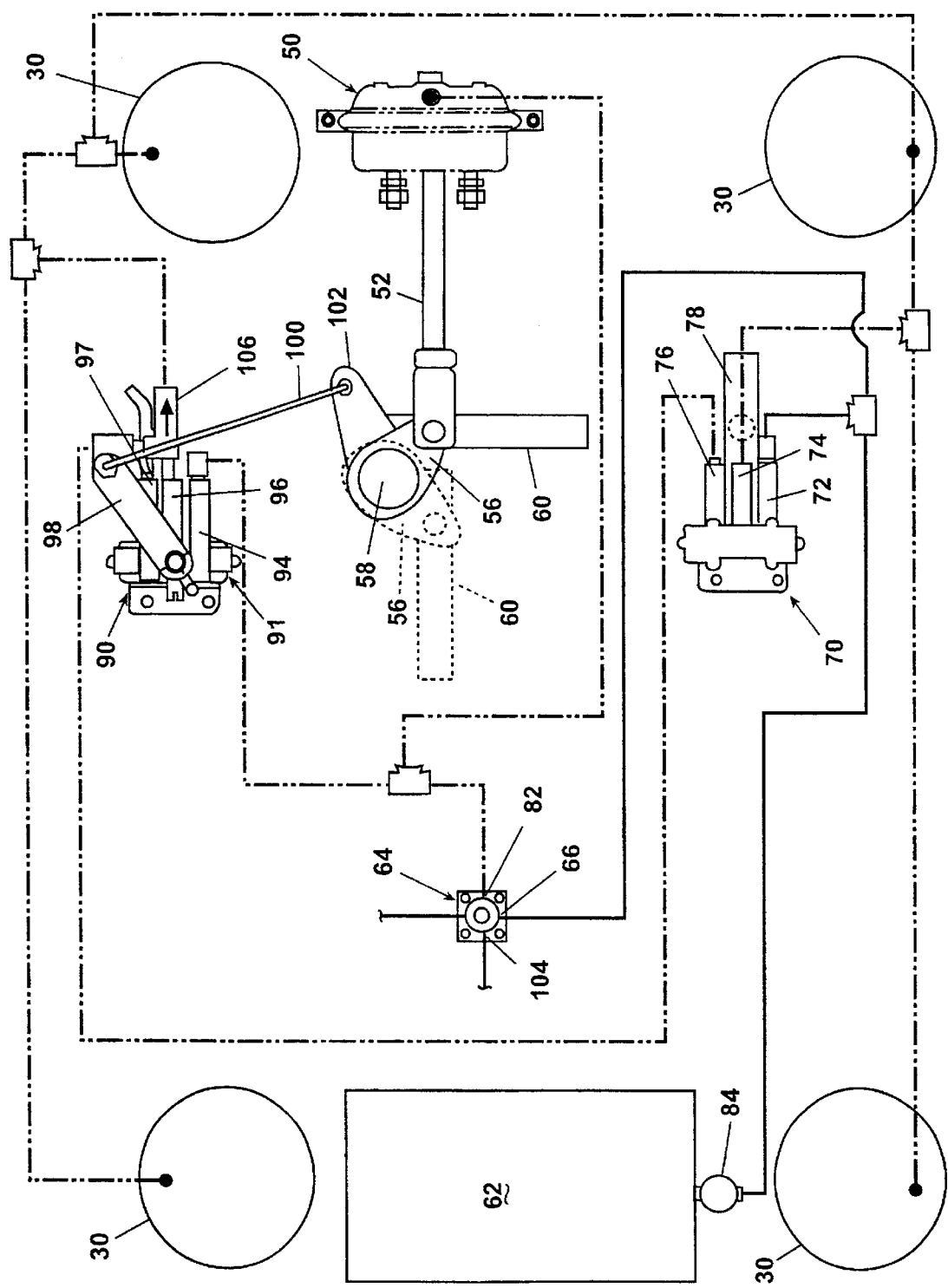
FIG. 3 is a schematic illustration of the air control system of FIG. 1.

Referring to FIGS. 1 and 2, the anti-creep device 12 comprises an air-operated actuator 50 mounted to a crossbeam (not shown) extending between the parallel frame rails 16. The actuator 50 comprises a reciprocating shaft 52 that terminates in a clevis 54. The reciprocating shaft moves between a retracted position and an extended position.

The actuator 50 is well known and does not require additional description. For the invention, it is only important to note that when pressurized air is supplied to the actuator 50, the shaft 52 is in the retracted position and when the actuator 50 is not supplied pressurized air, the shaft 52 is in the extended position.

A rod 58 spans the frame rails 16 and has a cam 56 that is rotatably pinned to the clevis 54. The rod 58 has opposing ends, each of which is disposed below the corresponding frame rail 16 and is pivotally mounted thereto. A stop arm 60 is welded to each end of the rod 58 and is movable between a retracted position (shown in phantom) and an extended position. The stop arm 60 is in the retracted position when the shaft 52 is in the extended position. Similarly, the stop arm 60 is in the extended (down) position when the shaft 52 is in the retracted position. Thus, when pressurized air is exhausted from the actuator, the arm is in the extended position.

When the stop arm 60 is in the retracted position, the trailing arm 24 is free to rotate relative to the frame 16. When the stop arm 60 is in the extended position, the trailing arm 24 can rotate only a short distance until it contacts the stop arm which thereby prevents further relative movement of the frame rail 16 with respect to the trailing arm 24.

The stop arm 60 is moved between the retracted and extended positions by the introduction and exhaustion, respectively, of pressurized air into and from the actuator 50 from an air reservoir tank 62, which is generally a compressor associated with the tractor. The compressor supplies pressurized air to the tractor/trailer through two separate systems known as the brake air system and the air spring system. The brake air system is divided into an emergency brake line and a service brake line. The compressor supplies pressurized air to an air reservoir tank 62, which is directly connected to the brake air system and connected through a pilot valve 64 and a pressure protection valve (PPV) 84 to the spring air system. The pilot valve 64 permits the flow of pressurized air to the spring air system only when the emergency brake line is pressurized. The release of the emergency brakes, which also function as the parking brakes, disconnects the pilot valve from the air supply. The PPV 84 fluidly connects the air reservoir tank 62 to the spring air system only when the pressure in the tank exceeds a predetermined pressure, typically about 70 psig.

The pilot valve 64 supplies air to the spring air system when the vehicle is under normal operation, i.e., the emergency brakes are not applied. The PPV 84 supplies pressurized air to the spring air system as required until the air reservoir tank drops below the threshold pressure. Generally, the tank will have sufficient pressure to supply the brake air system for a short time after the tractor's compressor is shut off or the emergency brakes are applied.

The pilot valve 64 has a normally closed port 66, a cylinder or common port 82, and a normally open exhaust port 104. The normally open and closed positions of the various pilot valve ports refer to the status of the ports when there is no pressurized air being supplied to the pilot valve 64 from the emergency brake line. When pressurized air is supplied to the pilot valve 64 from the emergency brake line, the cylinder port 82 is fluidly connected to the normally closed port 66 permitting fluid flow from the air reservoir tank 62 through the pilot valve 64 to the anti-creep device 12. When no pressurized air is supplied to the pilot valve 64, the ports 66, 82 are closed relative to each other, and the port 82 opens relative to the exhaust port 104, shutting off the air supply to the anti-creep device and opening the cylinder port 82 to the exhaust port 104.

When the anti-creep device 12 is supplied pressurized air by the pilot valve 64, pressurized air is supplied through the pilot valve 64 to the brake actuator valve 50 to maintain the reciprocating shaft 52 in the extended position and the stop arm 60 in the retracted position. When the pressurized air to the anti-creep device is shut off, the normally closed cylinder port 66 will close and air from the brake actuator 50 will pass through port 82 and exhaust through port 104. A spring in the brake actuator 50 causes the shaft 58 to rotate and move the arm 60 to the extended position.

A height control valve 70 is preferably mounted to the frame rail 16 and comprises an air supply port 72, air spring port 74, and exhaust port 76. The height control valve 70 further includes a pivotally mounted lever 78 to control the flow between the various ports 72, 74, 76. One end of the pivotally mounted lever 78 is connected to an upper end of an adjustable link 80, whose lower end is connected to the trailing arm 24. Thus, the relative movement of the frame rail 16 and trailing arm 24 will move the link 80, which will move the lever 78.

The lever 78 is movable between three operational positions: a fill position where the air supply port 72 is fluidly connected to the air spring port 74; a neutral position where none of the air supply port 72, air spring port 74, and exhaust port 76 are in fluid communication; and an exhaust position where the air spring port 74 is in fluid communication with the exhaust port 76.

The air supply port 72 is fluidly open to the normally closed port 66 of the pilot valve 64 and a pressure protection valve (PPV) 84. Both the pilot valve 64 and PPV 84 are supplied by the air supply 62. When the air supply 62 supplies air through the PPV 84, air is supplied to the air supply port 72 of the height control valve 14. When there is no air supply through the pilot valve 64, the PPV 84, no air is supplied to the height control valve 70. The height control valve is supplied air only as long as the pressure in the air reservoir tank 62 remains above the threshold pressure.

An automatic reset device 90 is provided to add pressurized air to the air springs 30 while the stop arm 60 is in the extended position, regardless of the ride height of the vehicle. The automatic reset device 90 comprises a sensor valve 91 having an inlet port 94, an air spring port 96, and an exhaust port 97. The inlet port 94 is fluidly connected to the cylinder port 82 of the pilot valve 64 so that pressurized air is supplied to the sensor valve 91 when the emergency brake line is pressurized. The air spring port 96 is connected to the air springs 30 through a check valve 106. The exhaust port 76 of the height control valve 70 connects to the output of the neutral port 96 below the check valve 106.

The sensor valve 91 further comprises a lever 98 that is operable between three positions. In the first or fill position, fluid flow is permitted between the inlet port 94 and the air spring port 96. In the second or neutral position, none of the ports 94, 96, and 97 are fluidly connected. In the third or exhaust position, the inlet port 94 is fluidly connected to the exhaust port 97. The lever 98 is operably connected to the rod 58 by a link 100 that extends from the lever 98 and is connected to a bracket 102 mounted on the rod 58.

The mechanical linkage between the rod 5S of the anti-creep device and the lever 98 of the automatic reset device couples the actuation of the valve 92 with the position of the stop arms 60 of the anti-creep device. For example, when the stop arms 60 are in the retracted position, the rod 58 will rotate to a position in which the lever 98 is moved to the exhaust position, blocking fluid communication between the inlet port 94 and the air spring port 96 to thereby block the flow of pressurized air from the air reservoir tank 62 to the air spring 30. When the stop arms 60 are in the extended position, the lever 98 is in the fill position in which the inlet port 94 and air spring port 96 are in fluid communication so that pressurized air can pass from the air reservoir tank 62 to the air springs 30, assuming the air supply is pressurized above the PPV 84 threshold.

The operation of the anti-creep device and automatic reset will now be described. Initially, a general description of the operation should prove beneficial to a more complete understanding. The air reservoir tank 62 supplies all of the pressurized air to the actuator 50, height control valve 70, and sensor valve 90. All of the air leaving the air reservoir tank 62 is directed through the pressure protection valve 84. No air can be supplied from the air reservoir tank 62 to the actuator 50, height control valve 70, and sensor valve 90, if the air pressure in the air reservoir tank 62 drops below the threshold value for the pressure protection valve 84.

The pilot valve 64 is supplied pressurized air from the air reservoir tank 62 through the pressure protection valve 84. The pilot valve 64 controls the flow of pressurized air from the air reservoir tank 62 to the sensor valve 90 and the actuator 50. If the emergency brakes are not applied, the pilot valve 64 fluidly connects the air from the air reservoir tank 62 to the actuator 50 and the sensor valve 90. If the emergency brakes are applied, the pilot valve disconnects the actuator 50 and sensor valve 90 from the pressurized air of the air reservoir tank 62 and exhausts the actuator 50 and sensor valve 90 to the atmosphere. If pressurized air supplied to the actuator 50 and the sensor valve 90, the emergency brakes cannot be applied and the pressurized air will tend to urge the arm 60 upwardly to the retracted position and the sensor valve 91 will fill the air springs 30 until the arm 60 is in the retracted position.

It is important to note that regardless of the status of the emergency brakes, the air reservoir tank 62 continuously supplies pressurized air to the height control valve 70 as long as the pressure in the air reservoir tank 62 exceeds the threshold pressure of the pressure protection valve 84. The exhaust of the height control valve 70 is fluidly connected to the air springs 30.

Looking at a typical operation scenario, as the trailer is being moved into a loading position, the arm 60 is in the retracted position, and the air reservoir tank 62 supplies pressurized air to the pilot valve 64 through the PPV 84 and the emergency brake line is pressurized. In this condition, the normally closed valves 66 and 82 to each other and the air supply to thereby supply pressurized air to the brake actuator 50, height control valve 70, and the automatic reset device 90. The normally open exhaust port 104 is closed. With pressurized air being supplied to the brake actuator 50, the reciprocating shaft 52 is extended to thereby maintain the stop arms 60 of the anti-creep device in their retracted position. With pressurized air supplied to the height control valve 70, the height control valve is free to maintain the ride height of the vehicle at the predetermined height as set by the adjustable link 80. With the pressurized air supplied to the automatic reset device 12, and the stop arms 60 being in the retracted position, the lever 98 of the reset valve 92 is maintained in the neutral position to prevent the flow of pressurized air from the vehicle air supply into the air springs 30.

Once the trailer is moved to the desired location for loading, the parking brakes are applied, exhausting the emergency brake line, which closes the port preventing the flow of pressurized air from the air reservoir tank 62 to the actuator 50 and sensor valve 90, and opens the exhaust port 104 to fluidly connect the actuator 50 and sensor valve 90 to atmosphere for exhausting. As the air is exhausted from the actuator 50 through the normally open port 104 of the pilot valve 64, the reciprocating shaft 52 is retracted to thereby rotate the rod 58 to move the stop arms 60 from their retracted position to their extended position and to fluidly connect ports 94, 96 of the sensor valve 91. With the stop arms 60 of the anti-creep device in their extended position, the trailer is now ready for loading.

In the parked position with the emergency brake line exhausted, the height control valve 70 is still connected to the air supply 62 through the PPV 84. If the lever 78 is in the fill position, ports 72 and 74 are fluidly connected and air springs 30 will take on air until the valve 70 is satisfied. If the valve 70 is in the neutral position, no air flow occurs to the air springs. If the valve 70 is in the exhaust position, ports 74 and 76 are fluidly connected, resulting in air being exhausted from the air springs 30 as it flows through ports 74, 76 to port 96, which is open to port 94, which is open to port 82, where it is exhausted out of exhaust port 104. If for some reason the arms 60 cannot be rotated to the extended position when the emergency brakes are applied (for example, no air from the supply 62 to pilot valve 64), the ports 96, 97 will be open to each other, instead of 94, 96, and the air springs 30 will exhaust through port 97, instead of 104.

As the trailer is loaded, the additional weight added to the trailer results in the relative movement of the frame rails 16 toward the trailing arm 24. The height control valve 70 will continue to supply pressurized air to the air springs 30 until the pressure in the air reservoir tank 62 drops below the threshold. Upon continued loading, the relative movement will continue between the frame rails 16 and the trailing arm 24 until the stop arms 60 abut the trailing arms to thereby prohibit further relative. movement of the frame rail 16 and trailing arm 24. Once the loading is completed, the trailer is prepared to be moved away from the loading position by the vehicle. The compressor on the tractor begins pressurizing the air reservoir tank 62 and pressurizes the emergency brake line. Upon the release of the parking brakes, the emergency brake line applies pressure to the pilot port, resulting in the opening of the normally closed valves 66 and 82 to each other and to the air reservoir tank 62 to supply pressurized air to the actuator 50, height control valve 70, and automatic reset device 90.

As the actuator 50 is pressurized, the arms 60 are initially in the extended position and the sensor valve 90 is in the fill position. If the arms 60 are trapped in the extended position because of the compressive force acting on the arms from the frame 16 and suspension 10, the sensor valve remains in the fill position and pressurized air passes through the open ports 94 and 96 to the air springs 30, regardless of the position of the lever 78 of the height control valve 70. The pressurized air will continue to flow from the sensor and valve to the air springs through the check valve 106 until the air springs 30 are inflated a sufficient amount to free the arms so that the actuator 50 can move the rod 58 and thereby move the arms 60 to their retracted position.

If the height control valve 70 is properly adjusted, it is most likely that the lever 78 will be in the fill position after loading and the ports 72, 74 will be open to each other because of the relative movement of the frame 16 toward the suspension 10 caused by the loading of the trailer. If the ports 72, 74 are open to each other, then pressurized air will be supplied to the air springs 30 through the height control valve 70 in addition to the pressurized air supplied by the reset device 90.

If the height control valve 70 is not properly adjusted and the arms 60 are stuck in their extended position, the height control valve 70 could be in either the neutral position or the exhaust position. In the neutral position, no air flow can pass through the height control valve 70. In the exhaust position, the ports 74, 76 are connected and pressurized air will be supplied to the air springs 30. Once the arms 60 have been rotated to the retracted position after the removal of the parking brake, the lever 98 of the valve 91 is rotated downwardly in response to the rotation of the rod 58 as the arms move to the retracted position and port 96 and 97 are then open to each other. In this position, no air can flow from the air springs through the check valve 106 back to either port 96 of the reset device 90 or port 76 of the height control valve 70. If the height control valve 70 is in the bypass position (ports 74 and 76 are open to each other), the pressurized air in the air springs 30 will exhaust to the atmosphere through port 96 and 97. If the ride height is too low, the height control valve 70 will be in the fill position (ports 72 and 74 are open to each other) and pressurized air will be supplied to the air springs 30.

From this point on, the height control valve 14 will solely control the addition and exhaustion of pressurized air from the air springs 30, until the next loading sequence.

The invention advantageously addresses the undesirable situation of the binding of the trailing arm suspension and the stop arms because the predetermined ride height is improperly set. The automatic reset device 90 permits the addition of pressurized air into the air springs 30 until the stop arms are retracted and then returns control to the height control valve for the continuation of normal operations.

Reasonable variation and modification are possible within the scope of the foregoing disclosure and claims without departing from the spirit of the invention which is defined in the appended claims.

What is claimed is:

1. A trailing arm suspension for supporting ground engaging wheels relative to a vehicle frame, the trailing arm suspension comprising:
    a trailing arm having a forward portion adapted to be mounted to the vehicle frame for pivotal movement with respect thereto;
    an air spring having one end mounted to the trailing arm and adapted to have another end mounted to the vehicle frame;
    an axle connected to the trailing arm for carrying the ground engaging wheels;
    a pneumatic air supply system for pressurizing the air spring and including a height control valve for controlling the introduction and exhaustion of pressurized air to and from the air spring to control the relative position of the vehicle frame with respect to the axle;
    anti-creep mechanism adapted to be mounted to the vehicle frame and movable between a retracted position where the trailing arm is free to pivot relative to the vehicle frame and an extended position where the trailing arm is substantially prevented from pivoting toward the vehicle frame, wherein the anti-creep mechanism comprises an arm adapted to be pivotally mounted to the vehicle frame, and wherein the arm extends between the vehicle frame and the trailing arm to block the relative pivotal movement of the trailing arm toward the frame;
    an auxiliary air supply system for pressurizing the air spring and including a second control valve for controlling the pressure to the air spring; and
    an actuator responsive to the movement of the anti-creep mechanism between the extended and retracted positions for closing the second control valve when the anti-creep mechanism is in the retracted position and for opening the second control valve when the anti-creep mechanism is in the extended position.

2. The suspension according to claim 1 wherein the actuator comprises a link coupling the arm to the second control valve wherein when the arm is in the retracted position, the link closes the control valve to prevent pressurization of the air spring; and when the arm is in the extended position, the link opens the control valve for pressurization of the air spring.

3. The suspension according to claim 2 wherein the control valve comprises a body having an inlet port fluidly connected to the auxiliary air supply system, an outlet port fluidly connected to the air spring, and a lever movable between a first position where the inlet and outlet ports are fluidly blocked and a second position where the inlet and outlet ports are fluidly connected, and the link is connected to lever and moves the lever between the first and second positions as the arm is moved between the retracted and extended positions.

4. The suspension according to claim 3 wherein the anti-creep mechanism further comprises a rod adapted to be rotatably mounted to the vehicle frame and the arm is fixedly mounted to the rod whereby rotation of the rod moves the arm between the retracted and extended positions.

5. The suspension according to claim 4 wherein the anti-creep mechanism further comprises an air-operated actuator connected to the rod and fluidly connected to the pneumatic air supply system, wherein when the pneumatic air supply system pressurizes the air-operated actuator, the rod is rotated to a retracted position where the arm is in the retracted position, and when the pressurized air to the air-operated actuator is exhausted, the rod is rotated to an extended position where the arm is in the extended position.

6. The suspension according to claim 5, and further comprising a source of pressurized air, a pilot valve fluidly connecting the source of pressurized air to the pneumatic air supply system and the auxiliary air supply system, and the pilot valve supplies pressurized air to the auxiliary supply system when the arm is in the extended position.

7. An anti-creep system for a trailing arm suspension comprising a trailing arm having a front portion mounted to a vehicle frame for pivotal movement with respect thereto, an air spring mounted at one end to the trailing arm and adapted to be mounted to the vehicle frame at another end, an axle connected to the trailing arm for carrying ground engaging wheels, and a pneumatic air supply system for pressurizing the air spring and including a height control valve for controlling the introduction and exhaustion of pressurized air to and from the air spring to control the relative position of the axle with respect to the vehicle frame, the anti-creep system comprising:
    an anti-creep mechanism adapted to be mounted to the frame and movable between a retracted position where the trailing arm is free to pivot relative to the vehicle frame and an extended position where the trailing arm is substantially prevented from pivotal movement toward the vehicle frame, wherein the anti-creep mechanism comprises an arm adapted to be pivotally mounted to the vehicle frame; and when the anti-creep mechanism is in the extended position, the arm extends between the vehicle frame and the trailer to block the relative pivotal movement of the trailing arm toward the frame;

auxiliary air supply system for pressurizing the air spring, including a second control valve for controlling the pressurized air supplied to the air spring; and an actuator responsive to the movement of the anti-creep mechanism between the extended and retracted positions for closing the second control valve when the anti-creep mechanism is in the retracted position.

8. The anti-creep system according to claim 7 wherein the actuator comprises a link coupling the arm to the second control valve wherein when the arm is in the retracted position, the link closes the second control valve to prevent the flow of pressurized air from the auxiliary air supply system to the air spring, and when the arm is in the extended position, the link opens the control valve to permit the flow of pressurized air from the auxiliary air supply to the air spring.

9. The anti-creep system according to claim 8 wherein the control valve comprises a body having an inlet port fluidly connected to the auxiliary air supply system, an outlet port fluidly connected to the air spring, and a lever movable between a first position where the inlet and outlet ports are fluidly separated and a second position where the inlet and outlet ports are fluidly connected, and the link is connected to lever and moves the lever between the first and second positions as the arm is moved between the retracted and extended positions.

10. The anti-creep system according to claim 9 wherein the anti-creep mechanism further comprises a rod adapted to be rotatably mounted to the vehicle frame and the arm is fixedly mounted to the rod whereby rotation of the rod moves the arm between the retracted and extended positions.

11. The suspension according to claim 10 wherein the anti-creep mechanism further comprises an air-operated actuator connected to the rod and fluidly connected to the pneumatic air supply system, wherein when the pneumatic air supply system pressurizes the air-operated actuator, the rod is rotated to a retracted position where the arm is in the retracted position, and when the pneumatic air supply system does not pressurize the air-operated actuator, the rod is rotated to an extended position where the arm is in the extended position.

12. A trailing arm suspension for controlling the movement of ground engaging wheels relative to a vehicle frame, the trailing arm suspension comprising:

a trailing arm having a forward portion adapted to be mounted to the vehicle frame for pivotal movement thereto;

an air spring mounted at one end to the trailing arm and adapted to be mounted at another end to the vehicle frame;

an axle connected to the trailing arm for carrying the ground engaging wheels;

a pneumatic air supply system for pressurizing the air spring and operable between a pressurized state and a non-pressurized state;

a height control valve fluidly connecting the pneumatic air supply to the air spring for controlling the introduction and exhaustion of pressurized air to and from the air spring to control the relative position of the axle with respect to the vehicle frame;

an air-operated anti-creep mechanism fluidly connected to the pneumatic air supply system and adapted to be mounted to the vehicle frame and movable between a retracted position where the axle is free to move relative to the vehicle frame and an extended position where the axle is substantially prevented from moving relative to the vehicle frame, wherein the anti-creep mechanism comprises an arm adapted to be pivotally mounted to the vehicle frame; and, the arm extends between the vehicle frame and the trailer to block the relative pivotal movement of the trailing arm toward the frame when the anti-creep mechanism is in the extended position;

a second control valve fluidly connecting the pneumatic system and the air spring and responsive to the movement of the anti-creep mechanism between the extended and retracted positions for opening the control valve to provide pressurized air to the air spring when the anti-creep mechanism is in the extended position.

13. The suspension according to claim 12 wherein the anti-creep mechanism further comprises a rod adapted to be rotatably mounted to the vehicle frame and the arm is fixedly mounted to the rod, whereby rotation of the rod moves the arm between the retracted and extended positions.

14. The suspension according to claim 13 wherein the anti-creep mechanism further comprises an air-operated actuator connected to the rod and fluidly connected to the pneumatic air supply system, wherein when the pneumatic air supply system pressurizes the air-operated actuator, the rod is rotated to a retracted position, and the rod is rotated to an extended position when the pneumatic air supply system does not supply pressurized air to the air-operated actuator.

15. A trailing arm suspension for controlling the movement of ground engaging wheels relative to a vehicle frame, the trailing arm suspension comprising:

a trailing arm having a forward portion adapted to be mounted to the vehicle frame for pivotal movement thereto;

an air spring mounted at one end to the trailing arm and adapted to be mounted at another end to the vehicle frame;

an axle connected to the trailing arm for carrying the ground engaging wheels;

a pneumatic air supply system for pressurizing the air spring and operable between a pressurized state and a non-pressurized state;

a height control valve fluidly connecting the pneumatic air supply to the air spring for controlling the introduction and exhaustion of pressurized air to and from the air spring to control the relative position of the axle with respect to the vehicle frame;

an air-operated anti-creep mechanism fluidly connected to the pneumatic air supply system and adapted to be mounted to the vehicle frame and movable between a retracted position where the axle is free to move relative to the vehicle frame and an extended position where the axle is substantially prevented from moving relative to the vehicle frame;

a second control valve fluidly connecting the pneumatic system and the air spring and responsive to the movement of the anti-creep mechanism between the extended and retracted positions for opening the control valve to provide pressurized air to the air spring when the anti-creep mechanism is in the extended position; and an actuator responsive to the movement of the anti-creep mechanism for opening the control valve when the anti-creep mechanism is in the extended position, wherein the actuator comprises a link coupling the arm to the control valve wherein when the arm is in the retracted position, the link closes the control valve preventing the flow of pressurized air from the auxiliary air supply system to the air spring, and when the arm is in the extended position, the link opens the control valve permitting the flow of pressurized air from the auxiliary air supply to the air spring.

16. The suspension according to claim 15 wherein the control valve comprises a body having an inlet port fluidly connected to the auxiliary air supply system, an outlet port fluidly connected to the air spring, and a lever movable between a first position where the inlet and outlet ports are not fluidly connected and a second position where the inlet and outlet ports are fluidly connected, and the link is connected to lever and moves the lever between the first and second positions as the arm is moved between the retracted and extended positions.

* * * * *

UNITED STATES PATENT AND TRADEMARK OFFICE
CERTIFICATE OF CORRECTION

PATENT NO. : 6,679,509 B1  
DATED : January 20, 2004  
INVENTOR(S) : Galazin et al.

It is certified that error appears in the above-identified patent and that said Letters Patent is hereby corrected as shown below:

<u>Column 2,</u>
Line 41, "unlooked" should be -- unhooked --.

<u>Column 6,</u>
Line 64, "rod 5S" should be -- rod 58 --.

<u>Column 11,</u>
Line 4, Before "auxiliary" insert -- an --.

Signed and Sealed this

Twenty-fifth Day of May, 2004

JON W. DUDAS
*Acting Director of the United States Patent and Trademark Office*